United States Patent [19]

Cavanaugh

[11] Patent Number: 5,533,774
[45] Date of Patent: Jul. 9, 1996

[54] VEHICLE EXTERIOR BODY PANEL SEAT

[76] Inventor: James C. Cavanaugh, P.O. Box 1774, York Beach, Me. 03910

[21] Appl. No.: 415,246

[22] Filed: Apr. 3, 1995

[51] Int. Cl.⁶ ........................................ B60N 1/00
[52] U.S. Cl. .................................... 296/66; 297/14
[58] Field of Search ................. 296/65.1, 66, 67, 296/183, 68, 68.1, 69, 50, 57.1, 37.6, 51; 297/14

[56] References Cited

U.S. PATENT DOCUMENTS

| | | | |
|---|---|---|---|
| 1,180,340 | 4/1916 | Thomas | 296/66 |
| 1,210,789 | 1/1917 | Freedman | 296/67 |
| 1,254,550 | 1/1918 | Trimlett | 296/66 |
| 1,569,274 | 1/1926 | Garrett | 296/50 |
| 1,654,439 | 12/1927 | Verdugt | 296/50 |
| 2,043,804 | 6/1936 | Montgomery | 296/66 |
| 2,678,121 | 5/1954 | Phillips | 296/51 X |
| 3,068,038 | 12/1962 | Douglass, Jr. | 296/183 X |
| 4,005,898 | 2/1977 | Way | 296/69 X |
| 4,135,761 | 1/1979 | Ward | 296/37.6 |
| 4,580,832 | 4/1986 | Maruyama et al. | 297/14 |
| 4,917,430 | 4/1990 | Lawrence | 296/37.6 |
| 5,000,504 | 3/1991 | Minguia | 296/57.1 X |
| 5,215,346 | 6/1993 | Reitzloff et al. | 296/65.1 X |
| 5,310,242 | 5/1994 | Golder | 297/14 |

FOREIGN PATENT DOCUMENTS 32921   2/1989   Japan ........................ 296/51

Primary Examiner—Joseph D. Pape

[57] ABSTRACT

A seat for supporting an individual relative to an exterior panel of a vehicle. The inventive device includes a seat assembly pivotally mounted within an aperture in an exterior body panel of a vehicle. A latch assembly retains the seat assembly within the body panel and can be selectively actuated to permit releasing of the seat assembly into a horizontal position, whereby an individual can be supported relative to the vehicle exterior.

4 Claims, 4 Drawing Sheets

VEHICLE EXTERIOR BODY PANEL SEAT

BACKGROUND OF THE INVENTION

1. Field of the Invention

The present invention relates to vehicle seating structures and more particularly pertains to an vehicle exterior body panel seat for supporting an individual relative to an exterior panel of a vehicle.

2. Description of the Prior Art

The use of vehicle seating structures is known in the prior art. More specifically, vehicle seating structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicle seating structures include U.S. Pat. Nos. 5,139,301; 4,902,070; 4,877,282; 4,527,828; and U.S. Pat. No. 4,460,215.

While these devices fulfill their respective, particular objectives and requirements, the aforementioned patents do not disclose a vehicle exterior body panel seat for supporting an individual relative to an exterior panel of a vehicle which includes a seat means pivotally mountable within an aperture inn an exterior body panel of a vehicle, and a latch means for retaining the seat assembly within the body panel which can be selectively actuated to permit releasing of the seat assembly into a horizontal position, whereby an individual can be supported relative to the vehicle exterior.

In these respects, the vehicle exterior body panel seat according to the present invention substantially departs from the conventional concepts and designs of the prior art, and in so doing provides an apparatus primarily developed for the purpose of supporting an individual relative to an exterior panel of a vehicle.

SUMMARY OF THE INVENTION

In view of the foregoing disadvantages inherent in the known types of vehicle seating structures now present in the prior art, the present invention provides a new vehicle exterior body panel seat construction wherein the same can be utilized for supporting an individual relative to a vehicle. As such, the general purpose of the present invention, which will be described subsequently in greater detail, is to provide a new vehicle exterior body panel seat apparatus and method which has many of the advantages of the vehicle seating structures mentioned heretofore and many novel features that result in a vehicle exterior body panel seat which is not anticipated, rendered obvious, suggested, or even implied by any of the prior art vehicle seating structures, either alone or in any combination thereof.

To attain this, the present invention generally comprises a seat for supporting an individual relative to an exterior panel of a vehicle. The inventive device includes a seat assembly pivotally mounted within an aperture in an exterior body panel of a vehicle. A latch assembly retains the seat assembly within the body panel and can be selectively actuated to permit releasing of the seat assembly into a horizontal position, whereby an individual can be supported relative to the vehicle exterior.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle exterior body panel seat apparatus and method which has many of the advantages of the vehicle seating structures mentioned heretofore and many novel features that result in a vehicle exterior body panel seat which is not anticipated, rendered obvious, suggested, or even implied by any of the prior art vehicle seating structures, either alone or in any combination thereof.

It is another object of the present invention to provide a new vehicle exterior body panel seat which may be easily and efficiently manufactured and marketed.

It is a further object of the present invention to provide a new vehicle exterior body panel seat which is of a durable and reliable construction.

An even further object of the present invention is to provide a new vehicle exterior body panel seat which is susceptible of a low cost of manufacture with regard to both materials and labor, and which accordingly is then susceptible of low prices of sale to the consuming public, thereby making such vehicle exterior body panel seats economically available to the buying public.

Still yet another object of the present invention is to provide a new vehicle exterior body panel seat which provides in the apparatuses and methods of the prior art some of the advantages thereof, while simultaneously overcoming some of the disadvantages normally associated therewith.

Still another object of the present invention is to provide a new vehicle exterior body panel seat for supporting an individual relative to an exterior panel of a vehicle.

Yet another object of the present invention is to provide a new vehicle exterior body panel seat which includes a seat means pivotally mountable within an aperture in an exterior body panel of a vehicle, and a latch means for retaining the seat assembly within the body panel which can be selectively actuated to permit releasing of the seat assembly into a horizontal position, whereby an individual can be supported relative to the vehicle exterior.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
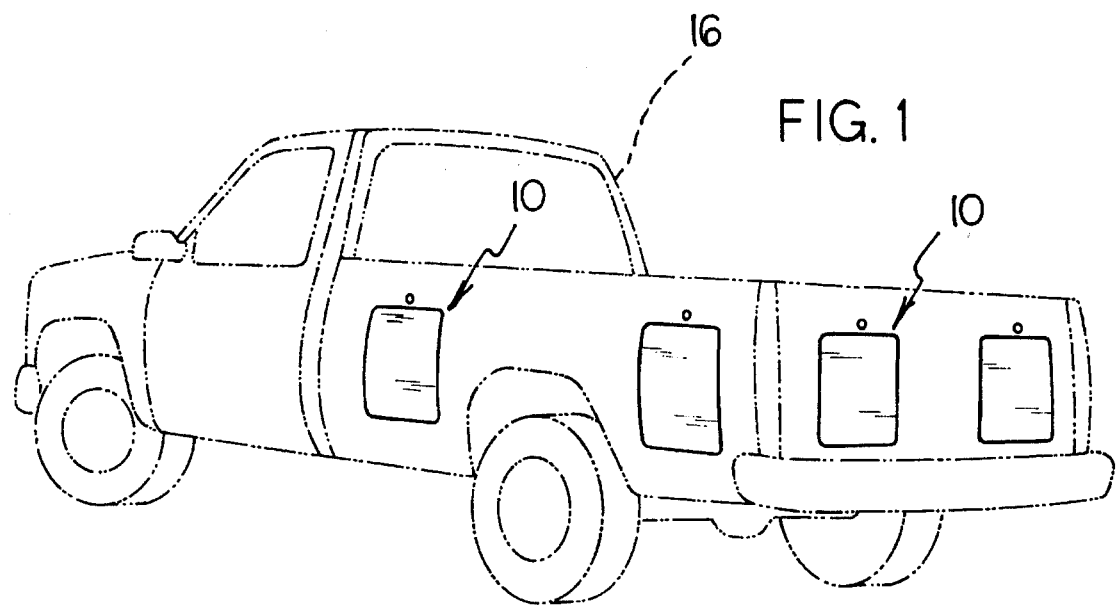
FIG. 1 is an isometric illustration of a vehicle exterior body panel seat according to the present invention in use.

With reference now to the drawings, and in particular to FIGS. 1–8 thereof, a new vehicle exterior body panel seat embodying the principles and concepts of the present invention and generally designated by the reference numeral 10 will be described.

More specifically, it will be noted that the vehicle exterior body panel seat 10 comprises a seat means 12 mountable within an unlabeled aperture extending through a body panel 14 of an associated vehicle 16. As shown in FIG. 1, the vehicle exterior body panel seat 10 can be mounted in one or more of the locations shown along line exterior of a pick-up truck or like vehicle 16. For example, a pick-up track vehicle 16 may include a truck bed, with the truck bed including an unlabeled tailgate exterior body panel and lateral exterior body panels (not labeled) extending in a substantially orthogonal orientation relative to the tailgate exterior body panel. In this case, the invention 10 can be mounted within an aperture of either one of the lateral exterior body panels or the tailgate exterior body panel. The seat means 12 is thus dimensioned so as to reside between the exterior body panel 14 and an interior panel of the bed of the truck 16. A latch means 18 is mounted to the body panel 14 for retaining the seat means 12 in the closed configuration and can be selectively actuated to permit pivoting of the seat means into a horizontal position, whereby an individual can be supported relative to the exterior body panel 14 of the vehicle 16.

Figure 2:
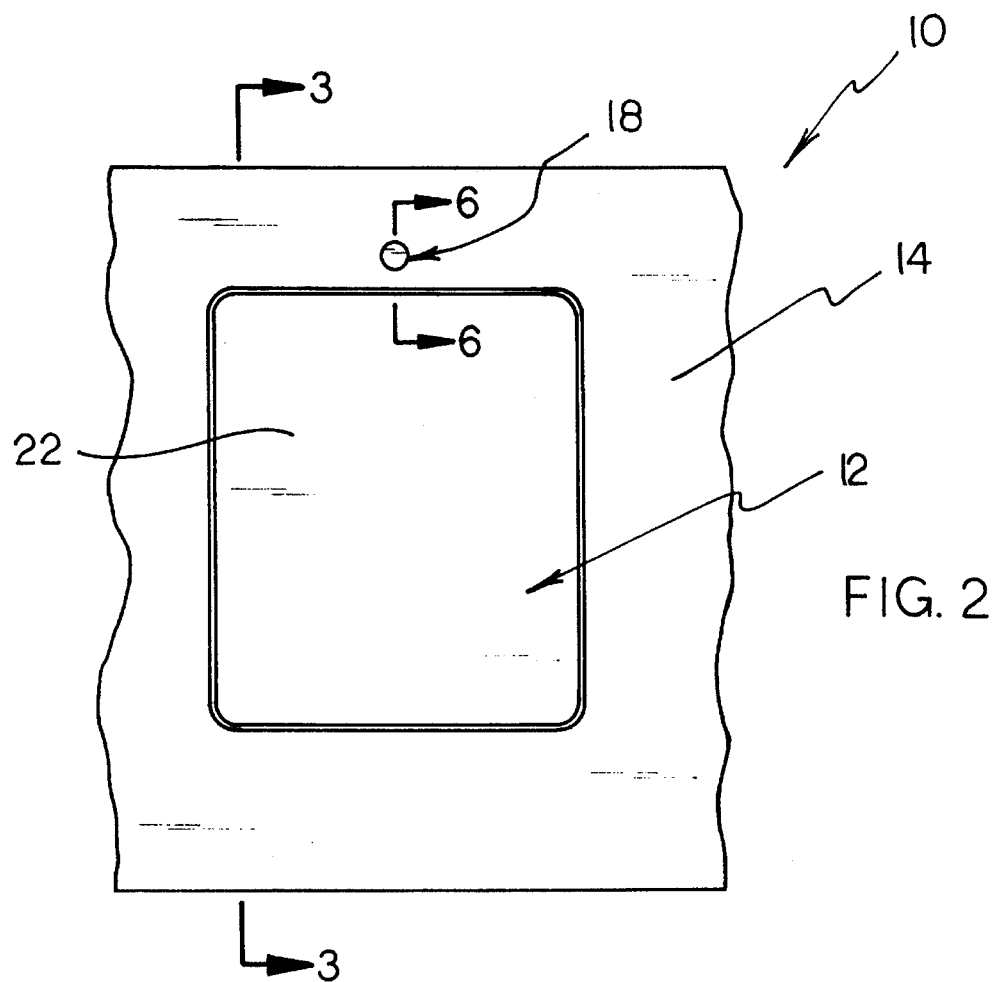
FIG. 2 is an elevation view of the invention.
Figure 3:
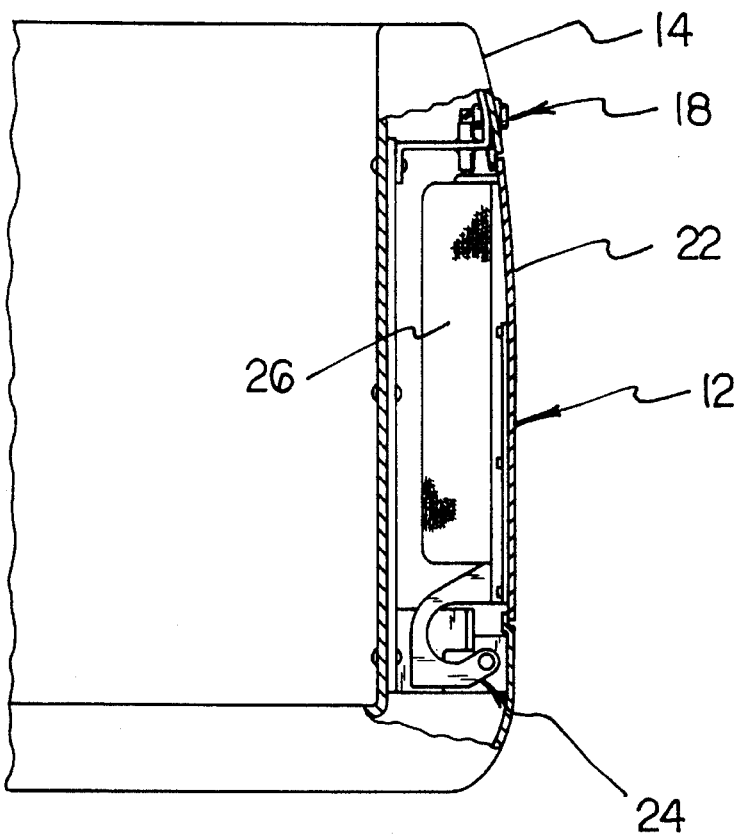
FIG. 3 is a cross sectional view taken along line 3—3 of FIG. 2.
Figure 4:
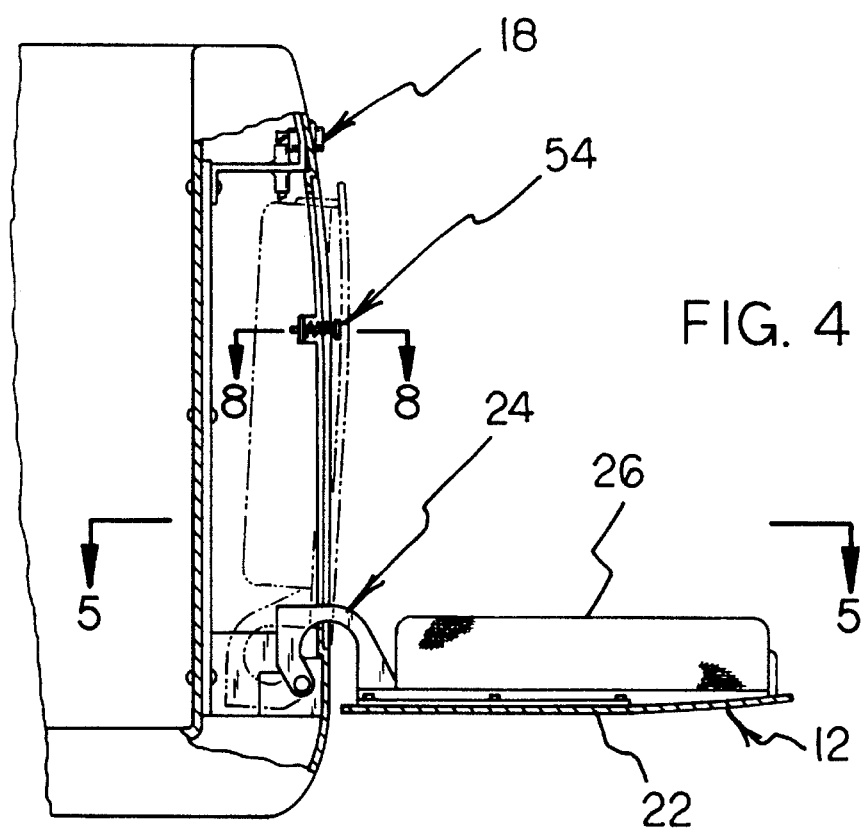
FIG. 4 is a cross sectional view of the invention in an open configuration.

As illustrated in FIGS. 2 through 4, it can be shown that the seat means 12 according to the present invention 10 preferably comprises an exterior panel 22 pivotally mountable to an interior of the body panel 14 of the truck 16 by a hinge means 24 for securing the exterior panel 22 within the aperture of the body panel 14 and permitting pivotal movement of the exterior panel between a vertical position illustrated in FIG. 3 and a horizontal position illustrated in FIG. 4. A seat pad 26 is mounted to an interior surface of the exterior panel 22 and serves as a cushion between an individual and the exterior panel 22 when sitting on the interior of the panel when the device 10 is opened as in FIG. 4.

Figure 5:
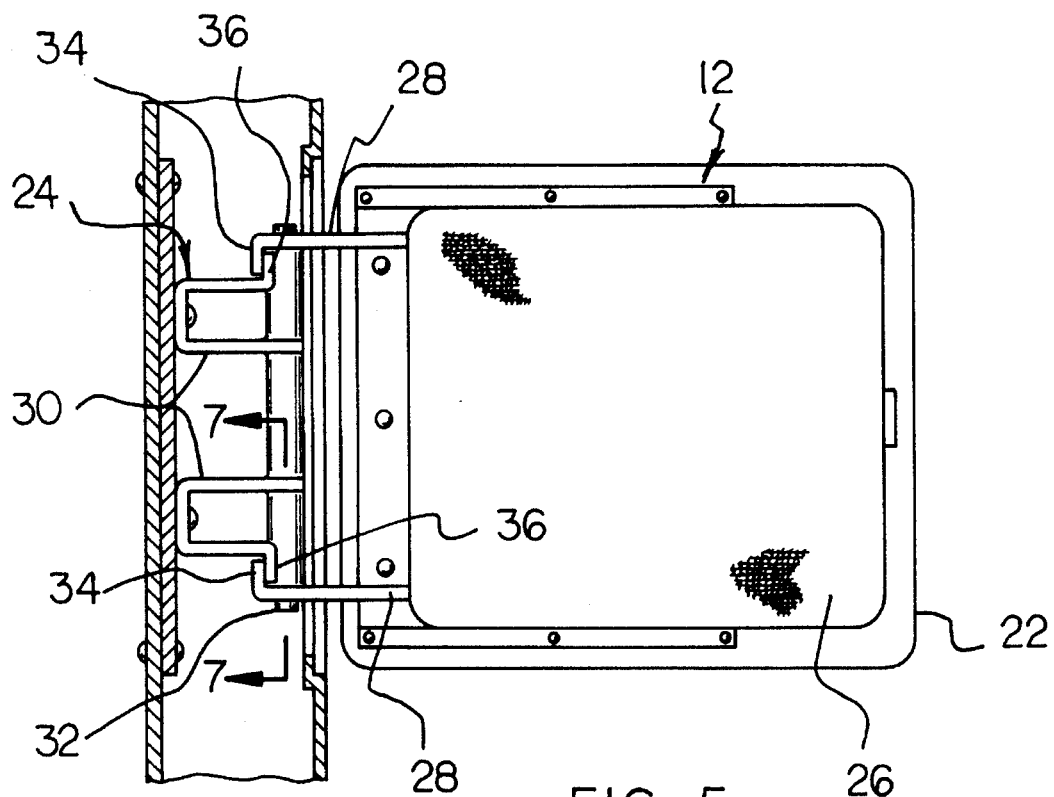
FIG. 5 is a cross sectional view taken along line 5—5 of FIG. 4.
Figure 7:
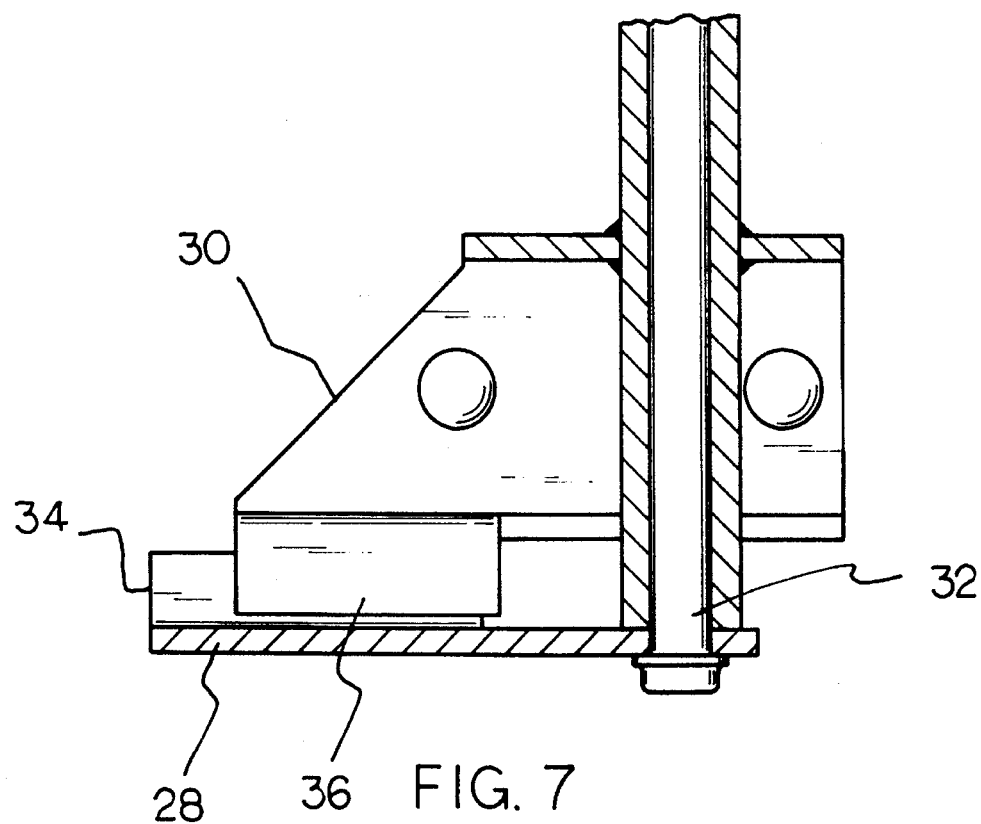
FIG. 7 is a cross sectional view taken along line 7—7 of FIG. 5.

As best illustrated in FIGS. 5 and 7, it can be shown that the hinge means 24 according to the present invention 10 preferably comprises a pair of seat brackets 28 mounted to the interior surface of the exterior panel 22, and a pair of mounting brackets 30 which can be secured to the vehicle 16 so as to reside within the body panel 14 proximal to the aperture extending therethrough. A pivot pin 32 extends through the mounting brackets 30 and the seat brackets 28 so as to pivotally couple the seat means 12 relative to the vehicle 16. To preclude pivoting of the seat means 12 beyond the horizontal orientation illustrated in FIG. 4, the seat brackets 28 each include a seat bracket abutment plate 34 which engages a mounting bracket abutment plate 36 when the device is pivoted from the aperture and the body panel 14 and into the horizontal orientation illustrated in FIG. 4.

Figure 6:
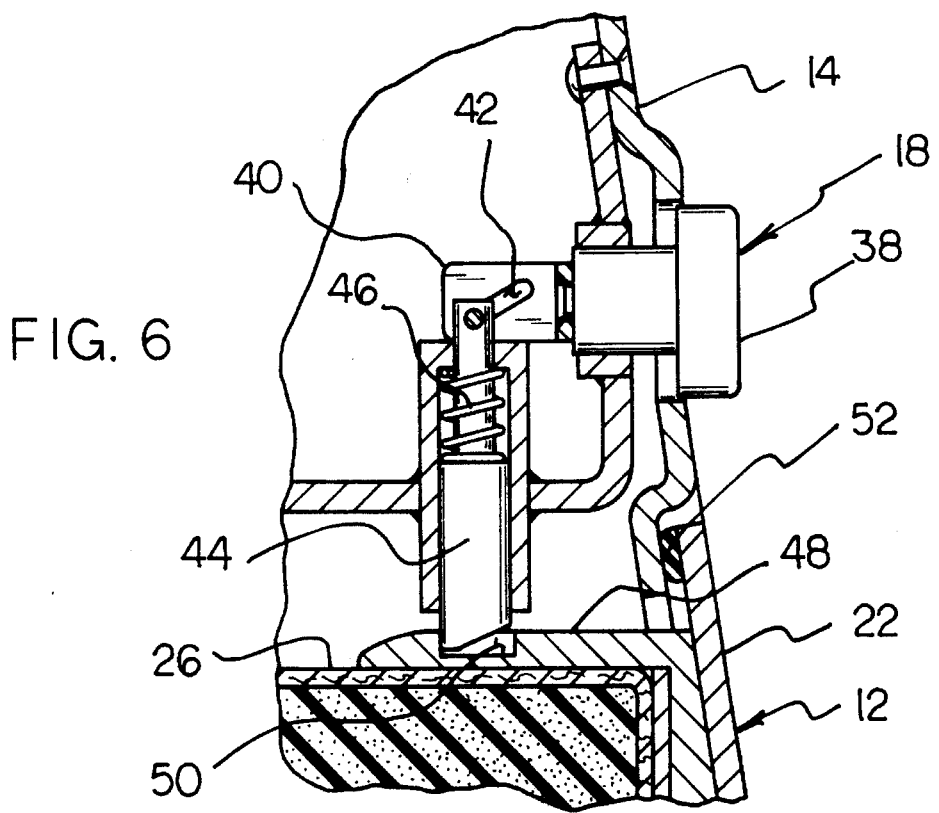
FIG. 6 is a cross sectional view taken along line 6—6 of FIG. 2.

Referring now to FIG. 6, it can be shown that the latch means 18 according to the present invention preferably comprises an exterior button 38 movably mounted relative to the body panel 14 for axial reciprocation along a longitudinal axial directed therethrough. An actuating plate 40 extends from an interior surface of exterior button 38 and includes an angled slot 42 oriented at an oblique angle relative to the longitudinal axis of the exterior button 38. A latch plunger 44 is movably mounted relative to the body panel 14 so as to be axially reciprocal along a longitudinal line directed through the latch plunger 44 and oriented substantially orthogonally relative to the longitudinal length of the exterior button 38. A spring 46 is interposed between the latch plunger 44 and the actuating plate 40 and operates to bias the latch plunger 44 towards the seat means 12. A catch plate 48 extending from the seat means 12 includes a detent notch 50 into which the latch plunger 44 projects so as to retain the exterior panel 22 of the seat means 12 in the closed configuration. The latch plunger 44 is coupled to the actuating plate 40 by an unlabeled pin which extends through the angled slot 42 thereof such that a depression of the exterior button 38 will effect retraction of the latch plunger 44 against a force of the spring 46 to remove the latch plunger from the detent notch 50 of the seat means 12 such that the exterior panel 22 and the associated seat means can be pivoted into the open or horizontal position. If desired, the seat means 12 may further comprises a perimeter seal 52, as shown in FIG. 6, extending along an interior perimeter surface of the exterior panel 22 for engaging a portion of the body panel 14 so as to form a seal precluding entrance of fluids through the aperture of the body panel 14.

Figure 8:
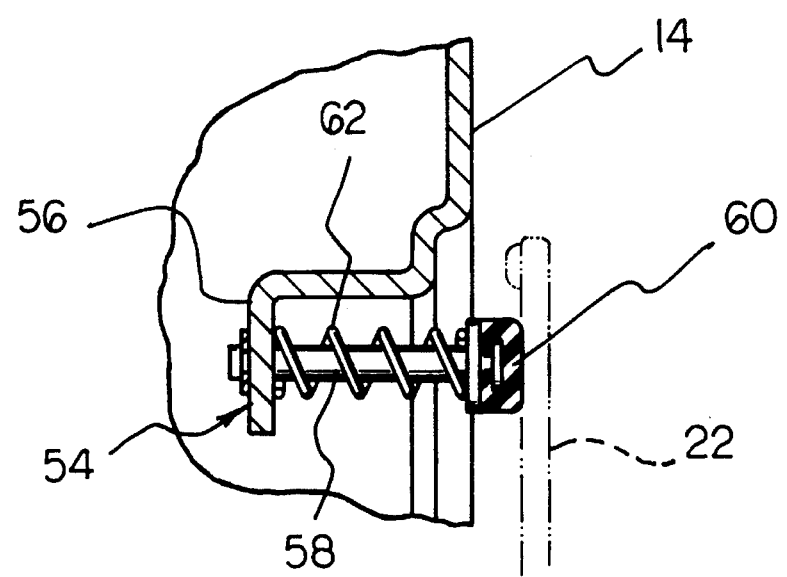
FIG. 8 is a cross sectional view taken along line 8—8 of FIG. 4.

To initially bias the seat means 12 from the aperture in the body panel 14 subsequent to actuation of the latch means 18, the present invention 10 may further comprise a spring-loaded initial opener 54 mounted to the body panel 14. As shown in FIG. 8, the spring-loaded initial opener 54 preferably comprises a support bracket 56 integrally or otherwise fixedly secured to an interior surface of the body panel 14. An opener plunger 58 is movably supported by the support bracket 56 for reciprocal engagement against an interior surface of the exterior panel 22 of the seat means 12. The opener plunger 58 terminates in an elastomeric bumper 60 positioned for engagement against the exterior panel 22. A spring 62 is interposed between the support bracket 56 and the bumper 60 so as to bias the bumper into contact with the interior surface of the exterior panel 22 to cause the seat means 12 to be extended from the aperture in the body 14 subsequent to actuation of the latch means 18.

In use, the vehicle exterior body panel seat 10 according to the present invention can be easily utilized for supporting an individual relative to an exterior surface of a vehicle 16 such as the pick-up truck illustrated in FIG. 1 of the drawings. The present invention 10 is configured so as to reside between the body panels typically utilized in the construction of a truck bed such that a holding capacity of the bed remains unaffected.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicle exterior body panel seat comprising:

a vehicle having an exterior body panel, the body panel having an aperture directed therethrough;

a seat means mounted within the aperture extending through the exterior body panel of the vehicle;

a latch means mounted relative to the vehicle for retaining the seat means in a closed configuration which can be selectively actuated to permit pivoting of the seat means into a horizontal open configuration, whereby an individual can be supported relative to the exterior body panel of the vehicle;

wherein the seat means comprises an exterior seal panel; a hinge means pivotally mounting the exterior seat panel within the aperture of the body panel for permitting pivotal movement of the exterior seat panel between a vertical position and a horizontal position, and a seat pad mounted to an interior surface of the exterior seat panel;

wherein the hinge means comprises a pair of seat brackets mounted to the interior surface of the exterior seat panel; a pair of mounting brackets secured to the vehicle so as to reside within the body panel proximal to the aperture extending therethrough; and a pivot pin extending through the mounting brackets and the seat brackets so as to pivotally couple the seat means relative to the vehicle;

wherein the hinge means further comprises a seat bracket abutment plate and a mounting bracket abutment plate which cooperatively engage to preclude rotation of the seat means beyond the horizontal position;

wherein the latch means comprises an exterior button movably mounted relative to the body panel for axial reciprocation along a longitudinal axis directed therethrough; an actuating plate extending from and interior surface of the exterior button, the actuating plate having an angled slot formed therein and oriented at an oblique angle relative to the longitudinal axis of the exterior button; a latch plunger movably mounted relative to the body panel so as to be axially reciprocal along a longitudinal line directed through the latch plunger and oriented substantially orthogonally relative to the longitudinal axis of the exterior button; a spring interposed between the latch plunger and the actuating plate and operating to bias the latch plunger towards the seat means; a catch plate extending from the seat means and including a detent notch into which the latch plunger can project so as to retain the exterior seat panel of the seat means in the closed configuration; and a pin coupling the latch plunger to the actuating plate which extends through the angled slot thereof such that a depression of the exterior button will effect retraction of the latch plunger against a force of the spring to remove the latch plunger from the detent notch of the seat means such that the seat means can be pivoted into the horizontal position.

2. The vehicle exterior body panel seat of claim 1, and further comprising a perimeter seal extending along an interior perimeter surface of the exterior panel for engaging a portion of the body panel so as to form a seal precluding entrance of fluids through the aperture of the body panel.

3. The vehicle exterior body panel seat of claim 2, and further comprising a spring-loaded initial opener mounted to the body panel for initially biasing the seat means from the aperture in the body panel subsequent to actuation of the latch means.

4. The vehicle exterior body panel seat of claim 3, wherein the spring-loaded initial opener comprises a support bracket securable to an interior surface of the body panel; an opener plunger movably supported by the support bracket for reciprocal engagement against an interior surface of the exterior panel of the seat means; a spring interposed between the support bracket and an end of the plunger to bias the plunger into contact with the interior surface of the exterior panel to cause the seat means to be extended from the aperture in the body panel subsequent to actuation of the latch means.

* * * * *